(12) United States Patent
Zhang et al.

(10) Patent No.: US 8,989,189 B2
(45) Date of Patent: Mar. 24, 2015

(54) SCALING IPV4 IN DATA CENTER NETWORKS EMPLOYING ECMP TO REACH HOSTS IN A DIRECTLY CONNECTED SUBNET

(75) Inventors: Ming Zhang, San Jose, CA (US); Shyam Kapadia, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 56 days.

(21) Appl. No.: 13/490,831

(22) Filed: Jun. 7, 2012

(65) Prior Publication Data

US 2013/0329730 A1 Dec. 12, 2013

(51) Int. Cl.
*H04L 29/12* (2006.01)
*H04L 12/741* (2013.01)

(52) U.S. Cl.
CPC .............. *H04L 61/103* (2013.01); *H04L 45/74* (2013.01)

USPC .......................................................... 370/392

(58) Field of Classification Search
CPC .. H04L 61/103; H04L 45/74; H04L 29/12028
See application file for complete search history.

(56) References Cited

U.S. PATENT DOCUMENTS

| 2011/0235508 A1* | 9/2011 | Goel et al. ..................... 370/230 |
| 2011/0317703 A1* | 12/2011 | Dunbar et al. ................ 370/392 |
| 2013/0223454 A1* | 8/2013 | Dunbar et al. ................ 370/400 |

\* cited by examiner

*Primary Examiner* — Huy D Vu
*Assistant Examiner* — Bao G Nguyen
(74) *Attorney, Agent, or Firm* — Merchant & Gould

(57) ABSTRACT

Systems and methods are provided for scaling IPv4 networks for large data centers to reach hosts in a directly connected subnet. ToRs may be dynamically selected in a load balanced manner to ensure that any host may deliver packets to any other host in two or less hops.

19 Claims, 4 Drawing Sheets

SCALING IPV4 IN DATA CENTER NETWORKS EMPLOYING ECMP TO REACH HOSTS IN A DIRECTLY CONNECTED SUBNET

BACKGROUND

Current trends suggest that data center architectures are evolving in that the network is envisioned to contain a large number of servers, both physical and virtual and the server-to-server traffic (east-west) is expected to dominate the traffic from the internet (north-south). Typically, servers are organized into a set of PODs. The interface toward a POD may be referred to as a Top-Of-Rack switch ("ToR"). The ToRs themselves are then interconnected hierarchically via a switch-fabric so that any server should be able to communicate with any other server. As the size of the data center goes up, scalability is one of the most prominent requirements where any-to-any communication should still be possible without large scale changes to the network infrastructure.

While having a large flat layer 2 network allows for the most "agility", such a network suffers from the serious drawback of serving as a single broadcast domain. Consequently, flooding, multicasts, and broadcasts are major problems since hosts may be un-necessarily bombarded. With IP becoming the de facto standard in data-centers, L3 ToR-based architectures are becoming increasingly common. Consequently, the bottle-neck in the ToR now shifts from the size of the MAC table to the FIB/Adjacency (next-hop) tables that are employed for IP routing. For purposes of the present disclosure it may be assumed that a vlan corresponds to a unique IP subnet.

In order to have the most flexibility in terms of resource allocation based on changing demand, there exists a need for data center providers to provision a subnet/vlan in any ToR. However, if a subnet spans multiple ToRs, then the any-to-any communication requirement will require ToRs to maintain a /32 address entry in the FIB tables for every host in the data center. As such there is a further need to effectively utilize the FIB tables on the individual ToRs while still satisfying the any-to-any communication requirement without compromising on the agility aspect.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
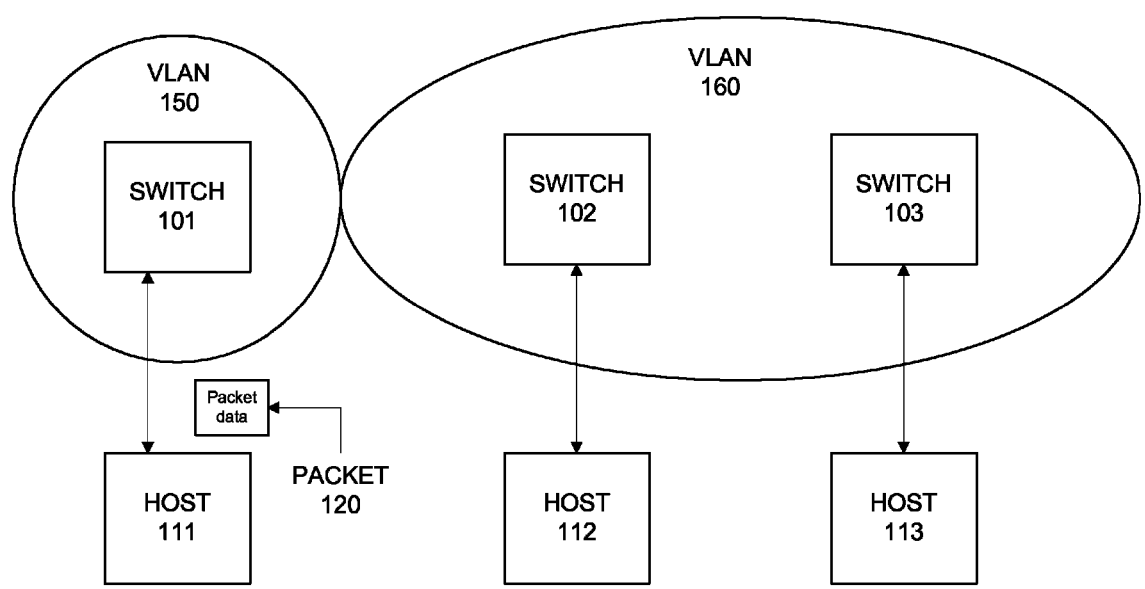
FIG. 1 illustrates an example network environment for embodiments of this disclosure.

Consistent with embodiments of the present disclosure, systems and methods are disclosed for providing an optimal data path load balancing scheme through enhancements to both the data layer and control layer.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description. Note that the terms host and server are used interchangeably in embodiments described in the present disclosure.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In order to improve IP scalability in distributed platforms like in a large data center, pending U.S. patent application Ser. No. 13/422,155 which is incorporated in there entirety herein, suggests employing ARP enhancements to implement a conversational IP based scheme. There, ToRs will only install entries in the FIB for directly connected servers that are currently part of a conversation or an active flow from at least one server in the associated POD. The problem with this approach is that it requires changes to the ARP protocol, is fairly complicated in terms of its implementation and requires sophisticated schemes to determine when to remove entries for inactive conversations as well as what candidates to evict to install newer entries in case the FIB tables approach their capacity.

As discussed above, the approach of anchoring a vlan to a given ToR is non-trivial in a case where a vlan spans multiple ToRs and hence servers from different PODs can be part of the same vlan. This flexibility is important so that unused resources from any POD can be rapidly provisioned into vlans on a demand basis without any changes to the network infrastructure.

It may be ensured that a vlan is owned by some ToR that has at least one member port in the same vlan. This may be done statically via configuration where a vlan is "homed" or "anchored" to a particular ToR. All the ToRs that do not have at least one port in the vlan will then simply install the subnet entry in their FIB corresponding to that vlan thereby redirecting the incoming traffic destined to that vlan to the anchored ToR.

The anchored ToR may then perform a L3 lookup on the packet that will hit the /32 address entry and a corresponding adjacency that will specify the rewrite to be applied to the packet. The rewritten packet may then be directed toward the destination which may be out of one of the local ports of the anchored ToR or a remote port. In case of the former, the rewritten packet is sent out of the local port. In case of the latter, the rewritten packet will be sent to the correct ToR that has the destination as its directly-connected-host (DCH). This last hop may be thought of as a bridging hop while the first-hop to the anchored ToR is a routing hop. This ensures that any server can reach any other server via a maximum of 2-hops while still allowing the data center to scale to millions of hosts.

The approach mentioned above may be undesirable in that it requires the anchoring to be specified statically or via configuration which may become tedious especially as the size of the data center grows. Moreover, the anchored ToRs can quickly become bottlenecks and be penalized as being an intermediate entity. This shifts the burden to perform network configuration/management in an extremely careful manner which can rapidly become unmanageable.

Ideally, all the ToRs that have at least one port in a given vlan should share the burden of traffic directed to that vlan. This kind of load balancing will ensure fairness and also allow for a rapid failover mechanism in case some ToR goes down. Moreover, this fairness should be enabled both at a data path as well as a control path level. Embodiments of the present disclosure propose to employ an ECMP based solution to solve the problem. First, a solution for the data traffic is described herein followed by an enhancement to alleviate the control plane scalability.

Embodiments of the present disclosure employ L3 ECMP functionality in the FIB to achieve optimal data-path load-balancing. The input to the ECMP hash can be the standard 5-tuple for a flow namely source-ip, destination-ip, layer 4 protocol, source port, and destination port. These embodiments allow for ipv4 scalability even with smaller FIB table sizes of the ToRs while still guaranteeing hosts reaching each other in <=2 hops. It should be understood that present embodiments may operate independent of the specific hash algorithm implemented in hardware.

Figure 2:
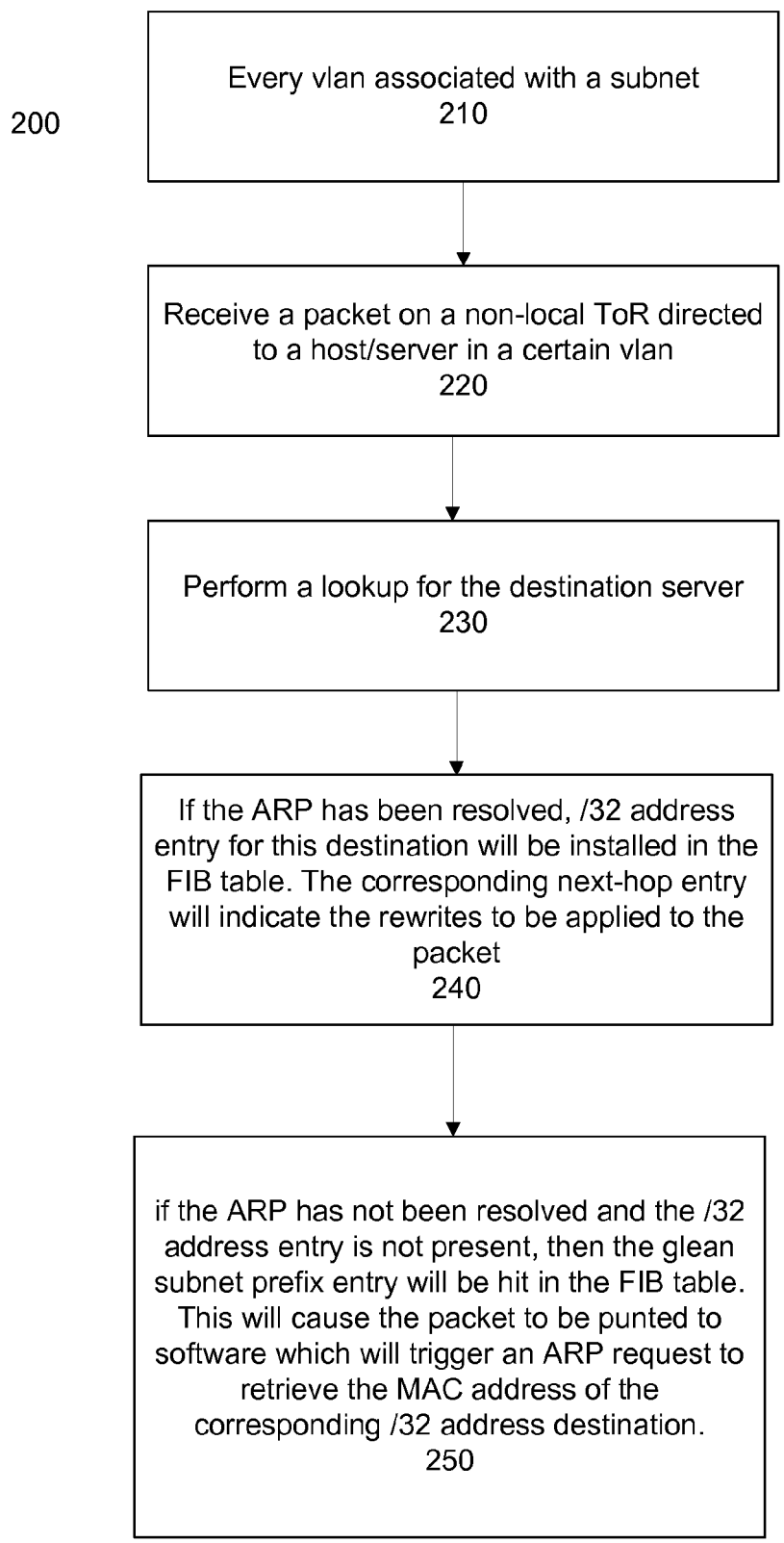
FIG. 2 is a flow chart illustrating embodiments of this disclosure.

FIG. 2 is a flow chart illustrating embodiments of the present disclosure to allow for ipv4 scalability even with smaller FIB table sizes of the ToRs while still guaranteeing hosts reaching each other in <=2 hops. Method 200 may start at step 210 where every vlan may be associated with a subnet. Software may keep track of ToR membership for a given vlan. The ToR memberships constitute the set of candidate next-hops that will be installed on every other non-local ToR whose FIB entry will have the subnet entry for this vlan pointing to an ECMP configuration.

Method 200 may then proceed to step 220. At step 220, whenever a packet is received on a non-local ToR destined to a host/server in a certain vlan, the subnet entry in the FIB will be hit. The ECMP configuration will pick one of a candidate set of ToRs that have local members in that vlan (1st hop). The hash selection is done in such a way that ensures that for a given flow the same candidate ToR is picked to avoid packet out-of-sequence issues for that flow.

Next, at step 230, once the packet reaches the candidate ToR, it will perform a forwarding lookup for the destination server. Two cases below are described depending on whether the ARP entry for this destination has been resolved. At step 240, if the ARP has been resolved, the /32 address entry for this destination will be installed in the FIB table. The corresponding next-hop entry will indicate the rewrites to be applied to the packet in terms of SMAC, DMAC, TTL-decrement etc. Now the final port of exit to reach this destination may be either local or remote (i.e. via another ToR). In case of the former, the rewritten packet is just sent out of the local port. In case of the latter, the rewritten packet will be sent to the correct ToR that has the destination as its directly-connected-host (DCH).

At step 250, if the ARP has not been resolved and the /32 address entry is not present, then the glean subnet prefix entry will be hit in the FIB table. This will cause the packet to be punted to software which will trigger an ARP request to retrieve the MAC address of the corresponding /32 address destination. Once the ARP response is obtained, the /32 address entry will be installed in all of the candidate ToRs for this vlan. Once the /32 address entry is installed, the remainder follows as if the ARP entry for this destination has been resolved as discussed above.

As such, any server can reach any other server via a maximum of two hops. The first hop is a routing-hop while the second one where the rewritten packet is directed to the target ToR is a bridging-hop. In this way, all candidate ToRs share the "burden" of hosting a particular vlan. The link oversubscription of the two hops is bounded and balanced since the total number of hosts (physical and/or virtual) per ToR is still bounded by the physical limits of the number of interfaces/ports on the ToR and the number of physical servers attached to the ToR.

If one of the candidate ToRs leaves or enters membership of a certain vlan, the ECMP candidate set may be appropriately updated either through a separate management plane or through an appropriate control protocol like iBGP, ISIS, etc. This will allow for adequate fault-tolerance to be built into the system so that a given ToR going down will only affect the hosts that are directly connected to that ToR and not the traffic for other hosts for which this ToR served as an intermediate hop.

Embodiments of FIG. 2 are especially useful in scenarios where a POD needs to be de-commissioned or migrated. In that case, the ECMP groups that have the corresponding ToR as a member can be rapidly updated by replacing it with another ToR. This ensures minimal traffic loss.

Embodiments of the present disclosure provide further improvements in the utilization of the FIB/next-hop tables in the ToRs. Specifically, the FIB tables may be intelligently utilized across all the ToRs to realize a distributed hash table for the host /32 address entries. Consequently, for any given host, its /32 address entry needs to be only stored in the FIB table of a "chosen" ToR which knows how to reach that host. All other ToRs need to send the packet to this ToR when they want to reach the same destination. In this way, host /32 address entries need not be duplicated across all ToRs across which a vlan/subnet spans.

For comparison purposes, assume 100,000 hosts in the data center distributed among 100 ToRs with 10 vlan/subnets per ToR. Next, assume that the number of hosts per vlan/subnet on average is 100,000/100=1000. In this case, with the earlier approach, the number of /32 address FIB entries consumed per ToR will be 1000 (hosts per vlan)×10 (vlans per ToR) =10000. However, using described embodiments, the number of /32 address FIB entries consumed per ToR will be 100,000 (no of hosts)/100(no of ToRs)=1000 (or 1000×2=2000 to cover virtual machine ("VM") motion cases, as discussed in further detail below.

The reduction in FIB table usage can be achieved by a further enhancement. The destination-ip (DIP) address can serve as a primary input for ECMP hash-selection when deciding which Egress ToR will be picked on an Ingress ToR. As before, for a given vlan/subnet, an ECMP may be a list of ToR IDs that belong to the same VLAN. Also for a VLAN/subnet, ToR IDs in the ECMP set should be programmed in the same order on all L3 Ingress ToRs and the same hashing algorithm should be used so that all traffic destined to a particular host should be forwarded to the same L3 egress ToR. This also helps to avoid packet-out-of-order issues for a given flow.

The base-line scheme along with the proposed enhancement can be illustrated with an example topology shown in FIG. 1 where switch 101, switch 102, and switch 103 are switches connected via some fabric spine to which host 111, host 112, and host 113 respectively are directly attached. A Vlan 150 may be on switch 101 with a subnet address of 1.1.1.0/24. A Vlan 160 may span over switch 102 and switch 103 with a subnet address of 2.2.2.0/24. Similarly, host 111, host 112, host 113 may have addresses of 1.1.1.2, 2.2.2.2, 2.2.2.3 respectively.

For example, the resulting FIB/ADJ table after employing embodiments described in FIG. 2 may read:

| Switch 101 | | Switch 102 | | Switch 103 | |
|---|---|---|---|---|---|
| FIB | ADJ/Next-Hop | FIB | ADJ/Next-Hop | FIB | ADJ/Next-Hop |
| 1.1.1.0/24 | Glean | 1.1.1.0/24 | Switch 101 | 1.1.1.0/24 | Switch 101 |
| 2.2.2.0/24 | Switch 102 | 2.2.2.0/24 | Glean | 2.2.2.0/24 | Glean |
| | Switch 103 | 2.2.2.2/32 | DMAC(Host 112), intf(2/1), vlan = 160 | 2.2.2.2/32 | DMAC(Host 112), intf(2/1), vlan = 160 |
| 1.1.1.1/32 | DMAC(Host 111), Intf(1/1), vlan = 150 | 2.2.2.3/32 | DMAC(Host 113), Intf(3/1), vlan = 160 | 2.2.2.3/32 | DMAC(Host 113), Intf(3/1), vlan = 160 |

Figure 3:
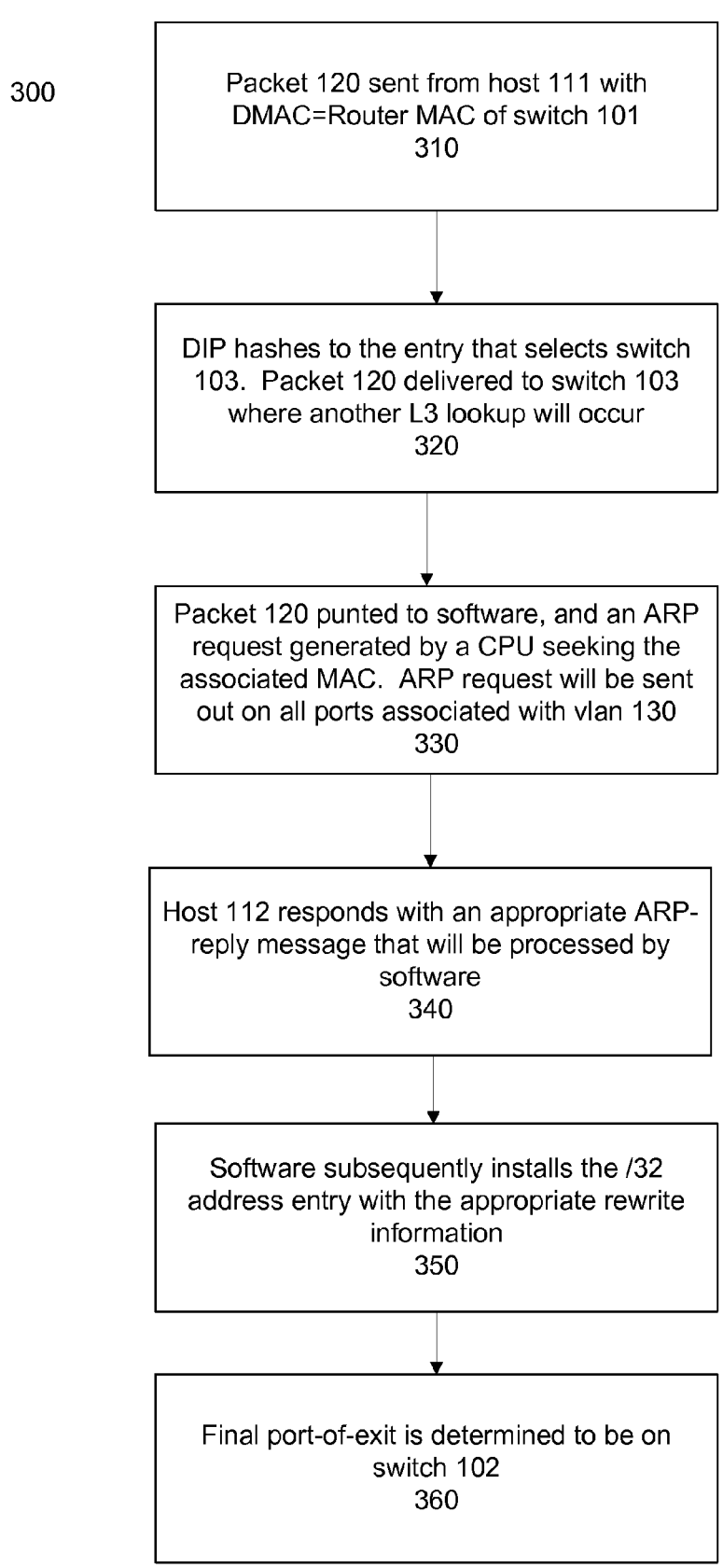
FIG. 3 is a flow chart illustrating embodiments of this disclosure.

FIG. 3 is a flow chart illustrating embodiments of the present disclosure with the proposed enhancement to reduce FIB table utiliization. In that case, the FIB/ADJ table may read:

| Switch 101 | | Switch 102 | | Switch 103 | |
|---|---|---|---|---|---|
| FIB | ADJ/Next-Hop | FIB | ADJ/Next-Hop | FIB | ADJ/Next-Hop |
| 1.1.1.0/24 | Glean | 1.1.1.0/24 | Switch 101 | 1.1.1.0/24 | Switch 101 |
| 2.2.2.0/24 | Switch 102 | 2.2.2.0/24 | Glean | 2.2.2.0/24 | Switch 102 |
| | Switch 103 | | Switch 103 | | Glean |
| 1.1.1.1/32 | DMAC(Host 101), Intf(1/1), vlan = 150 | 2.2.2.3/32 | DMAC(Host 103), Intf(3/1), vlan = 160 | 2.2.2.2/32 | DMAC(Host 102), Intf(2/1), vlan = 160 |

Assuming host 111 (1.1.1.2) wants to communicate with host 112 (2.2.2.2). Method 300 may begin at step 310, where a packet 120 may be sent from host 111 with DMAC=Router MAC of switch 101. When switch 101 gets the packet, the 2.2.2.0/24 entry will be hit in hardware. This entry may be programmed as an ECMP entry with two possible next-hop choices, namely switch 102 and switch 103. Note that typically adjacency may be programmed with the destination indexes to reach switch 102 and switch 103. The destination-index may also take the form of MACs or switch-IDs for switch 102 and switch 103. For example in order to reach switch 102 or switch 103, a MAC-in-MAC overlay may also be used with the outer-encap having the MAC address of the destination switch similar to what is done with layer 2 overlays like Fabricpath and TRILL (Transparent Interconnection of Lots of Links).

Assuming that DIP=2.2.2.2 hashes to the entry that selects switch 103, method 300 will proceed to step 320 where packet 120 will be duly delivered to switch 103 where another L3 lookup will occur. This time, the 2.2.2.0/24 entry will be hit and again based on the ECMP hash-selection the second entry that points to Glean will be picked. Consequently, method 300 will proceed to step 330 where packet 120 will be punted to software, and an ARP request will be generated by a CPU seeking the MAC associated with 2.2.2.2. The ARP request will be sent out on all ports associated with vlan 160.

At step 340, host 112 may respond with an appropriate ARP-reply message that will be processed by software. Next, at step 350, the software may subsequently install the 2.2.2.2/32 entry with the appropriate rewrite information like SMAC, DMAC, TTL etc. only on switch 103. This is because every time a packet is destined to 2.2.2.2 it will be sent to switch 103 where a fresh lookup will be done.

Once the packet has been rewritten on switch 103, method 300 may proceed to step 360. At step 360, the final port-of-exit is determined to be on switch 102. Consequently, the packet is bridged to ToR switch 102 where it is subjected to a fresh lookup. Note that since this is a L2 packet, it will undergo an L2 lookup. Subsequently, based on the DMAC lookup, the packet will be sent out to host 112.

It is important to re-emphasize that with this scheme, 2.2.2.2/32 may only be installed on ToR switch 103. In this way, for every host a ToR is selected on which the /32 address host entry will be installed. This is a significant improvement compared to other proposed approaches. Moreover, the ToR on which the /32 address is installed is based on the DIP or the /32 address itself and not the specific switch or port on which the host is attached (location-independence which helps with VM mobility scenarios).

To address VM mobility scenarios, embodiments of the present disclosure introduce a "home" ToR and an "attached" ToR for a given host. The home ToR is the ToR that is the logical home of the host as determined by ECMP hashing. The attached ToR is the ToR to which the host is directed connected to. When a VM moves, the home ToR always remains the same but the attached ToR keeps changing.

To be able to support VM Mobility and to minimize the FIB utilization, present embodiments program a FIB entry on both the home ToR and the attached ToR. Assume hashing for host 112 results as switch 102, so 2.2.2.2/32 address FIB entry is programmed on switch 102 triggered by packets flowing to host 112. Assume that now host 112 moves to switch 103. Because of the VM move, a gratuitous ARP may be sent from host 112. It arrives at switch 103 and is processed by ARP process in a CPU associated with switch 103. A new FIB entry 2.2.2.2/32 is added on switch 103 by ARP. This gratuitous ARP also triggers MAC learning in L2 on the VLAN/subnet among ToRs. At this stage, there are total of two 2.2.2.2/32 FIB entries on all ToRs, one at the home ToR and the other one at the attached ToR.

Embodiments of the present disclosure for ensuring load balancing at a data path level guarantee any-to-any communication within a maximum of 2-hops in a data center for millions of hosts. For example, in the embodiments illustrated in regards to FIG. 2, ToRs only need to store /32 addresses for vlans/subnets for which it has local port membership. For other subnets, it only needs to maintain subnet prefixes that allow packets to be redirected to some ToR using ECMP which in turn directs them toward the correct ToR to which the destination is attached.

Embodiments of the present disclosure as illustrated further with FIG. 1, for every host /32 address, a distributed hash table is realized that requires only two ToRs in the entire data center need to store this address in their hardware FIB tables.

Embodiments of the present disclosure require no new hardware support than what exists in forwarding engines that support basic L3 routing. The intelligence lies in how the tables should be programmed by software. Present embodiments operate independent of what kind of fabric inter-connect exists between the ToRs. It could be a single gigantic fabric or a series of spine fabric cards connected in multiple tiers. Similarly, embodiments, will operate seamlessly even in the presence of overlay headers like TRILL, FabricPath, etc.

Embodiments of the present disclosure describe how the control plane can be adequately scaled. In general, the ToRs themselves have their local CPUs which can be leveraged to implement distributed ARP functionality. In that way, ARP requests and ARP responses can be locally serviced thereby reducing the burden on the central controller.

An ARP cache may be maintained locally in each ToR and they may be kept in sync with the ARP caches on other ToRs as well as the controller via multicast supported messaging schemes. While this may adequately scale as the data center grows, one of the issues remaining to be addressed is the ARP cache refresh queries. Every refresh period, the ARP entries need to be refreshed in order to check if a host/server is still up. If every ToR were to perform this ARP refresh for every local host in its ARP cache, then the control traffic overhead would be tremendous.

To address this concern, embodiments of the present disclosure ensure that only one of the candidate ToRs that has a certain vlan membership needs to trigger the ARP refresh query. Based on the response, it can update the other candidate ToRs via an optimized messaging scheme (either multicast it to all candidate ToRs or send it to the central controller which in turn can send an update message to the candidate ToRs).

To determine which ToR should trigger this ARP refresh query, present embodiments employ a hashing scheme (could be based on the ECMP algorithm as well) in software that selects the candidate ToR based on the destination IP (/32) address of the host for which the query has to be sent out. This would ensure that the control traffic overhead is reduced as well as making sure that the candidate ToRs are equally sharing the refresh-query-triggering burden.

Embodiments of the present disclosure describing how the control plane can be adequately scaled reduce the ARP related traffic load in the network by intelligently selecting a candidate ToR to do ARP refreshes for each /32 address host entry and communicating that information to the other ToRs. The ToRs need to be using a similar hashing scheme for determining whether they should trigger an ARP refresh for a particular /32 address host entry.

Figure 4:
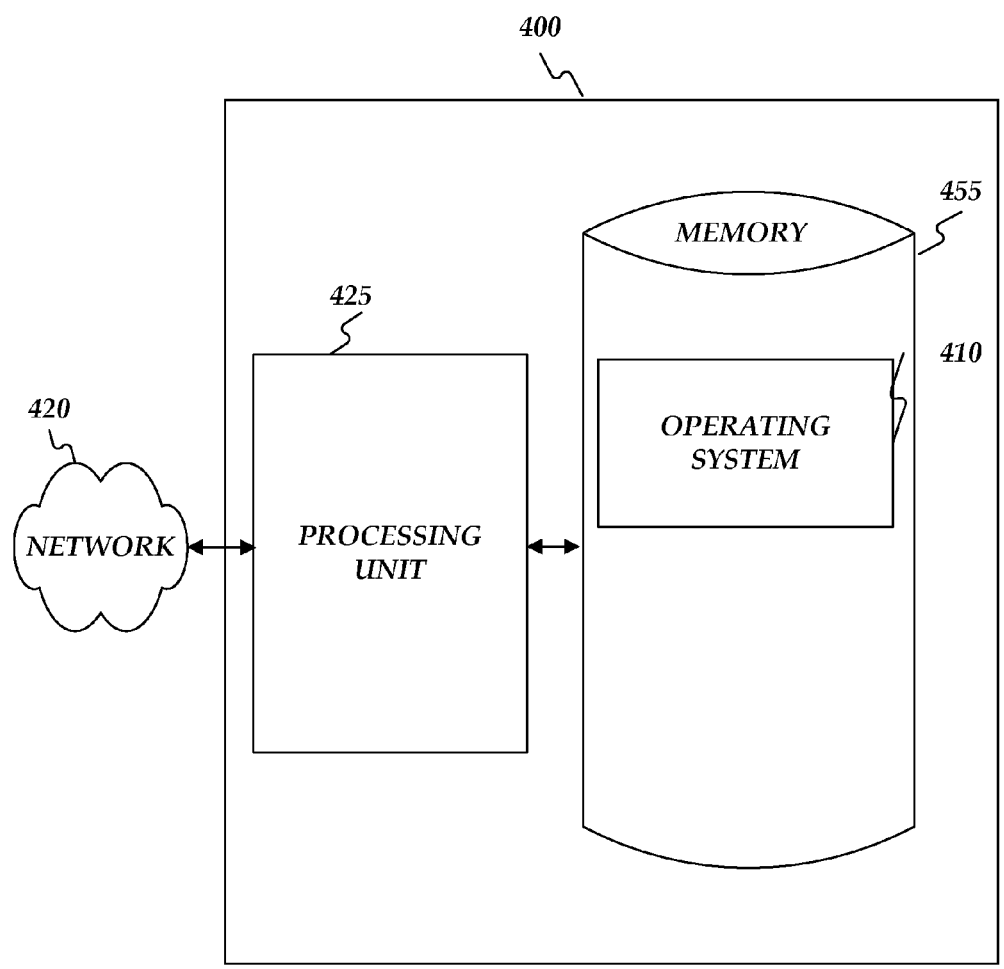
FIG. 4 is a block diagram of a computing network device.

FIG. 4 illustrates a computing device 400, such as a server, host, or other network devices described in the present specification. Computing device 400 may include processing unit 425 and memory 455. Memory 455 may include software configured to execute application modules such as an operating system 410. Computing device 400 may execute, for example, one or more stages included in the methods as described above. Moreover, any one or more of the stages included in the above describe methods may be performed on any element shown in FIG. 4.

Computing device 400 may be implemented using a personal computer, a network computer, a mainframe, a computing appliance, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method for IPv4 scaling comprising:
    associating each of a plurality of vlans with a respective subnet;
    receiving a packet on a first non-local Top-Of-Rack switch (ToR), wherein the packet is directed to a server in a first vlan;
    selecting one of a candidate set of ToRs that have local members in the first vlan, wherein candidate selection comprises employing a hash function that ensures that a candidate ToR is selected to avoid packet out-of-sequence issues;

sending the packet to the selected candidate ToR;

performing a lookup for a destination server at the selected candidate ToR;

generating an ARP request seeking a MAC address associated with a destination IP address associated with the packet and sending the ARP request out on all ports associated with a first VLAN;

determining whether an ARP entry for the destination server has been resolved; and installing the /32 address entry for the destination server in a Forwarding Information Base (FIB) table if the ARP entry has been resolved.

2. The method of claim 1, further comprising tracking the ToR membership for each of the plurality of vlans.

3. The method of claim 2, wherein ToR membership comprises a set of candidate next-hops to be installed on all non-local ToRs whose FIB entry has a subnet entry for the vlan associated with the ToR.

4. The method of claim 1, wherein a corresponding next-hop entry indicates rewrites to be applied to the first packet.

5. The method of claim 1, further comprising: hitting a glean subnet prefix entry if the ARP entry has not been resolved; punting the first packet to software; triggering an ARP request to retrieve a MAC address for a corresponding /32 address destination.

6. The method of claim 5, further comprising: installing the corresponding /32 address destination as entries in the candidate set of ToRs.

7. The method of claim 1 further comprising: detecting that a ToR leaves or enters membership of a certain vlan; and updating the candidate set of ToRs.

8. A method for IPv4 scaling comprising:

realizing a distributed hash table across a plurality of Top-Of-Rack switches (ToRs) for a plurality of host /32 address entries, wherein for each host device, the host device's /32 address is only stored in a Forwarding Information Base (FIB) table of a designated ToR;

generating an ARP request seeking a MAC address associated with a destination IP address associated with a first packet of a plurality of packets and sending the ARP request out on all ports associated with a first VLAN from the designated ToR; and sending a plurality of packets addressed to the same destination through the designated ToR.

9. The method of claim 8, further comprising: receiving destination ip addresses as a primary input for ECMP hash selection, wherein the hash selection results in the selection of an egress ToR for a particular ingress ToR.

10. The method of claim 9, wherein for a given VLAN the ECMP is a list of ToR identifiers, where the ToRs each belong to the given VLAN.

11. The method of claim 10, wherein the list of ToR identifiers are programmed in the same order on each of a plurality of L3 ingress ToRs on the given VLAN.

12. A method comprising:

receiving at a first switch a first packet from a first host with a destination MAC address associated with the first switch;

hitting an ECMP destination-index entry associated with one or more second-hop choices;

hashing a final destination address of the first packet to obtain a second-hop choice selection;

sending the first packet to a switch device associated with the second-hop choice selection;

performing a hash function at the switch device that result in selection of a Glean entry;

punting the first packet to a software;

generating an ARP request seeking a MAC address associated with a destination IP address associated with the first packet; and sending the ARP request out on all ports associated with a first VLAN.

13. The method of claim 12, wherein the second hop choices comprise one of: MAC addresses or switch device identifiers.

14. The method of claim 12, further comprising: receiving an ARP reply message; and installing a /32 address entry with rewrite information only on the second-hop choice selection.

15. The method of claim 14 further comprising: determining a final port of exit; and bridging the first packet to the final port of exit.

16. The method of claim 15, further comprising: performing a destination MAC address lookup at the final port of exit; and sending the first packet to the final destination address.

17. The method of claim 12, further comprising: designating a home ToR as the logical home of the first host; designating an attached ToR as the ToR to which the first host is directly connected to.

18. The method of claim 17, further comprising: detecting a move of a virtual machine; and designating a new attached ToR as the ToR directly connected to a host associated with the virtual machine.

19. The method of claim 12, further comprising: selecting one of a plurality of candidate ToRs to trigger an ARP refresh query, wherein the selection is determined based on a hash algorithm that selects the ToR based on the destination address of the host for which the ARP refresh query has to be sent out.

* * * * *